(12) United States Patent
Reese et al.

(10) Patent No.: US 11,072,099 B2
(45) Date of Patent: Jul. 27, 2021

(54) METHOD AND APPARATUS FOR COMPOSITE RIB AND SHEET MOLDING II

(71) Applicant: Arris Composites Inc., Berkeley, CA (US)

(72) Inventors: Riley Reese, Oakland, CA (US); Erick Davidson, Piedmont, CA (US); Ethan Escowitz, Berkeley, CA (US); J. Scott Perkins, Oakland, CA (US)

(73) Assignee: Arris Composites Inc., Berkeley, CA (US)

( * ) Notice: Subject to any disclaimer, the term of this patent is extended or adjusted under 35 U.S.C. 154(b) by 0 days.

(21) Appl. No.: 16/938,602

(22) Filed: Jul. 24, 2020

(65) Prior Publication Data

US 2021/0023744 A1 Jan. 28, 2021

Related U.S. Application Data

(60) Provisional application No. 62/878,006, filed on Jul. 24, 2019.

(51) Int. Cl.
  *B29C 43/02* (2006.01)
  *B29C 43/18* (2006.01)
  (Continued)

(52) U.S. Cl.
  CPC ............ *B29C 43/021* (2013.01); *B29C 33/14* (2013.01); *B29C 43/18* (2013.01); *B29C 43/36* (2013.01);
  (Continued)

(58) Field of Classification Search
  CPC ....... B29C 43/021; B29C 43/18; B29C 43/36; B29C 2043/3665; B29C 2043/325; B29C 2043/3255; B29C 2043/3602; B29C 43/361; B29C 70/40; B29C 70/42; B29C 70/46; B29C 43/38; B29C 2043/189;
  (Continued)

(56) References Cited

U.S. PATENT DOCUMENTS 2,981,976 A * 5/1961 Maier .................. B29C 43/361
                                                        425/417
5,756,406 A * 5/1998 Rittman ................ B29C 43/183
                                                        442/117

(Continued)

FOREIGN PATENT DOCUMENTS

| EP | 1892077 | 2/2008 |
|---|---|---|
| GB | 0150633 | 9/1920 |
| WO | WO2004106044 | * 12/2004 |

OTHER PUBLICATIONS

Authorized Officer Moeller Bichler, M, International Search Report and Written Opinion dated Nov. 12, 2020 in PCT Patent Application No. PCT/US2020/043575.

*Primary Examiner* — Jeffrey M Wollschlager
(74) *Attorney, Agent, or Firm* — Kaplan Breyer Schwarz, LLP

(57) ABSTRACT

Some embodiments of a compression mold for forming a rib-and-sheet part includes a mold cavity and a mold insert. A sheet is placed in the mold cavity, and the mold insert is placed on the sheet. A preform assemblage is placed in a gap that is formed between the mold insert and the wall of the mold cavity. A mold core is biased above the preform assemblage, prior to molding operations, via a compression spring.

18 Claims, 7 Drawing Sheets

(51) Int. Cl.
  *B29C 43/36*   (2006.01)
  *B29L 31/34*   (2006.01)
  *B29L 7/00*    (2006.01)
  *B29C 70/46*   (2006.01)
  *B29C 33/14*   (2006.01)
  *B29C 43/32*   (2006.01)

(52) U.S. Cl.
  CPC ...... *B29C 70/46* (2013.01); *B29C 2043/3255* (2013.01); *B29C 2043/3665* (2013.01); *B29L 2007/002* (2013.01); *B29L 2031/3437* (2013.01)

(58) Field of Classification Search
  CPC ....... B29C 43/32; B29C 70/081; B29C 70/12; B29C 70/20; B29C 70/84; B29C 33/306; B29C 33/14; B29L 2031/3437; B29L 2007/002; B29K 2105/0872; B29K 2105/0881; B29K 2105/14; B29D 99/0014; B29B 11/16
  See application file for complete search history.

(56) References Cited

U.S. PATENT DOCUMENTS

| | | | |
|---|---|---|---|
| 5,916,603 A * | 6/1999 | Pleasant | B29C 33/303 164/341 |
| 2008/0060530 A1* | 3/2008 | Tetreault | B29C 33/14 99/355 |
| 2019/0016025 A1* | 1/2019 | Dahl | B29C 43/02 |
| 2019/0061206 A1* | 2/2019 | Dahl | B29C 33/12 |
| 2020/0114591 A1 | 4/2020 | Reese et al. | |
| 2020/0114596 A1 | 4/2020 | Davidson et al. | |

* cited by examiner

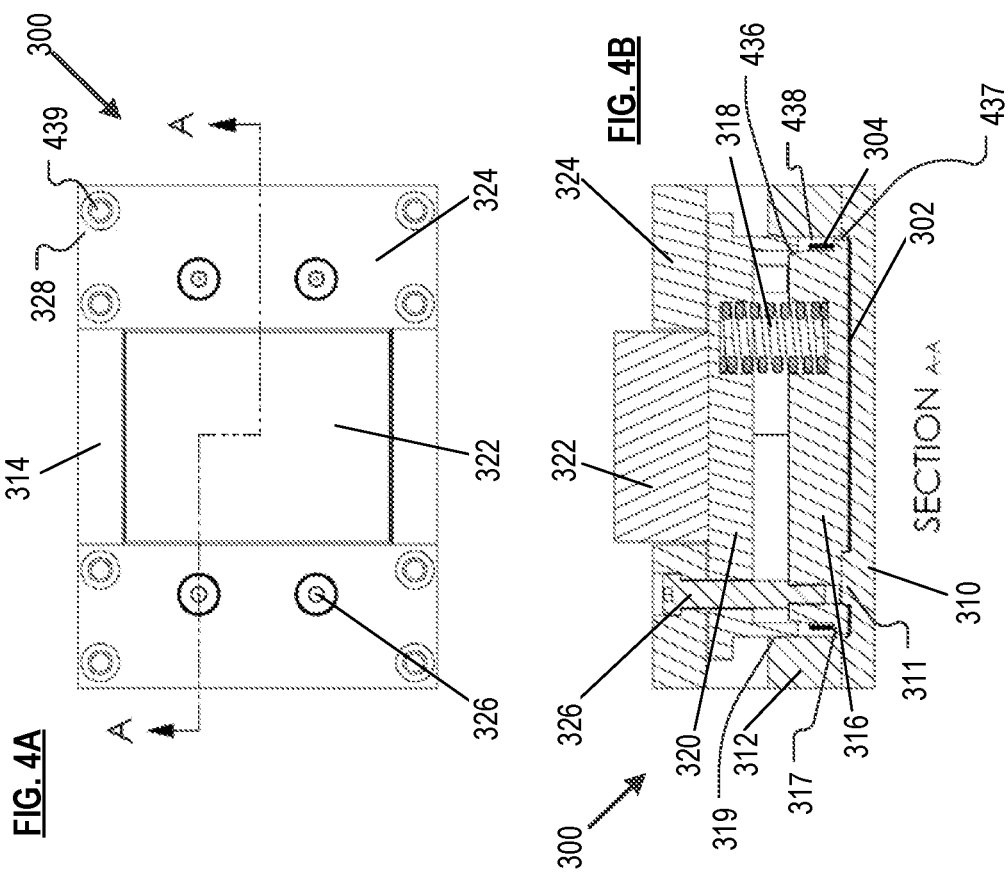

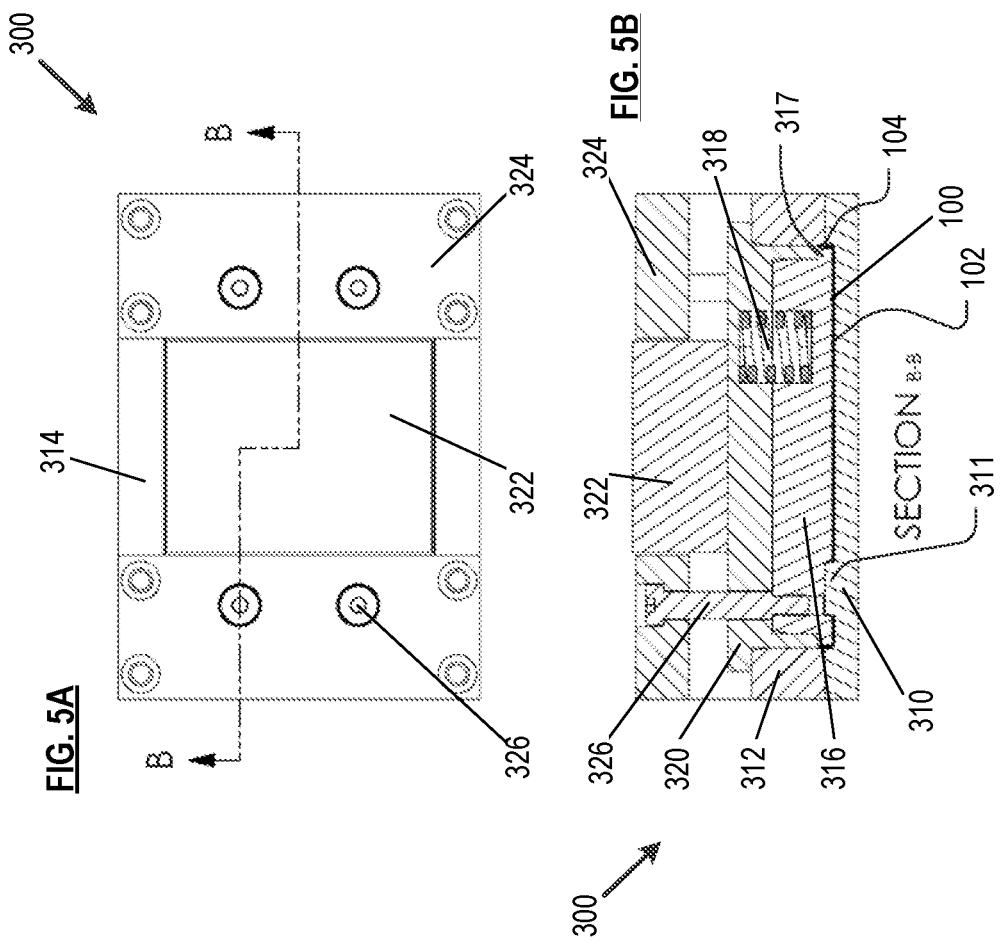

METHOD AND APPARATUS FOR COMPOSITE RIB AND SHEET MOLDING II

STATEMENT OF RELATED CASE

This case claims priority to U.S. Pat. App. 62/878,006 filed Jul. 24, 2019 and which is incorporated by reference herein.

FIELD OF THE INVENTION

The present invention relates to fiber-composite parts.

BACKGROUND

Some structural parts consist of a sheet supported with rib-like structures. Composite materials, which are strong, stiff, and light, have been used to create such rib-and-sheet architectures, sometimes in combination with metals or other materials. Composite rib-and-sheet parts are usually made from chopped fibers in a two-step process. In particular, the rib(s) and sheet(s) are created separately and then bonded together, such as with an adhesive.

SUMMARY

In accordance with the present teachings, ribs having continuous, unidirectionally aligned fibers are used to reinforce the sheet portion of rib-and-sheet parts. This results in a rib-and-sheet part having much higher strength and stiffness than the prior art, wherein the ribs are usually made from chopped fiber. Furthermore, rather than bonding the rib to the sheet as in the prior art, in embodiments of the invention, the unidirectionally aligned, continuous reinforced rib is molded to the sheet(s) in a co-molding process. This imbues the final part with material properties that are superior to what can be obtained using prior-art techniques.

The rib-and-sheet parts are fabricated in a one-step process in which fiber-bundle-based preforms and sheets (or precursors thereof) are combined in a mold and consolidated in a single step. In some embodiments, individual fiber-bundle-based preforms are added to the mold to form an appropriate layup; in some other embodiments, an assemblage of such preforms (a "preform charge") is first created and then placed in the mold en masse with the sheets. Unlike the one-step process applicant disclosed in US 2020/0114591, embodiments of the instant invention use a floating-mold insert to create a rib-and-sheet structural part.

In the one-step process for forming rib-and-sheet parts disclosed in US 2020/0114591, it can, in certain instances, be difficult to maintain a desired fiber alignment due to the fact that the preforms are stacked in the cavity portion of the mold prior to placement of the male mold portion. Insertion of the male mold can disrupt the stack of preforms, even if in the form of a preform charge. The floating mold insert of the present invention, which is a discrete element of the mold, serves to (1) hold down the sheet (or sheet precursor), and (2) align and support the preform layup/preform charge. In particular, the preforms are placed on the mold insert, such that the preforms are stabilized between the insert and the wall of the cavity portion. This substantially prevents any disruption of the preform stack when the mold is ultimately closed.

In some embodiments, the invention provides a compression mold for forming, via compression molding, a rib-and-sheet part using a preform assemblage and sheet as feed constituents, wherein the compression mold comprises a cavity-defining member, the cavity-defining member having an internal wall defining a perimeter of a cavity; and a mold insert, wherein the mold insert is dimensioned to be received within the perimeter of the cavity, and is physically adapted to:

(a) abut, at a bottom surface thereof, the sheet, and
(b) form a gap between a sidewall of the mold insert and the internal wall of the cavity-defining member, wherein the gap is dimensioned to receive and retain the preform assemblage, and wherein the gap is formed before receiving the preform assemblage.

In summary, the compression mold, as depicted and described, comprises a mold cavity and a mold insert. The mold insert, in conjunction with the mold cavity, serves at least two purposes: (1) it compresses the sheet, and (2) provides a means for receiving and supporting the preform assemblage. With respect to item (2), this ensures that when the mold is ultimately dosed, the preforms in the preform assemblage retain theft alignment. Embodiments of the compression mold may further include at least one the following features, in addition to others disclosed herein and the appending drawings:

- a mold core slidably coupled to the mold insert;
- a compression spring that supports the mold core about the mold insert;
- shoulder bolts along which the mold core slides toward the mold insert;
- the shoulder bolts couple to the mold insert;
- a beam that supports the shoulder bolts;
- a standoff attached to a mold cavity;
- the beam is coupled to the standoff and at a fixed vertical distance;
- the length of the shoulder bolts, in conjunction with the fixed vertical distance; between the beam and the standoff set the vertical height of the mold insert with respect to the sheet;
- a gap formed between the sidewalls of the mold insert and the walls of the cavity;
- a hard stop between the mold core and the cavity defining member;
- a hard stop between the mold core and the mold insert;
- registration features;
- the mold insert having a marginal region for supporting the preform assemblage when it is in the gap formed between the mold insert and the cavity; and
- a rib cavity formed between the marginal region of the mold insert and the cavity.

BRIEF DESCRIPTION OF THE DRAWINGS

FIG. 4A depicts a top view of the mold of FIGS. 3A and 3B in an assembled state.
FIG. 4B depicts an offset sectional view of mold of FIGS. 3A and 3B in an assembled state.
FIG. 5A depicts the view of the mold of FIG. 4A after the molding sequence, but prior to part ejection.
FIG. 5B depicts the view of the mold of FIG. 4B after the molding sequence, but prior to part ejection.

DETAILED DESCRIPTION

Figure 1:
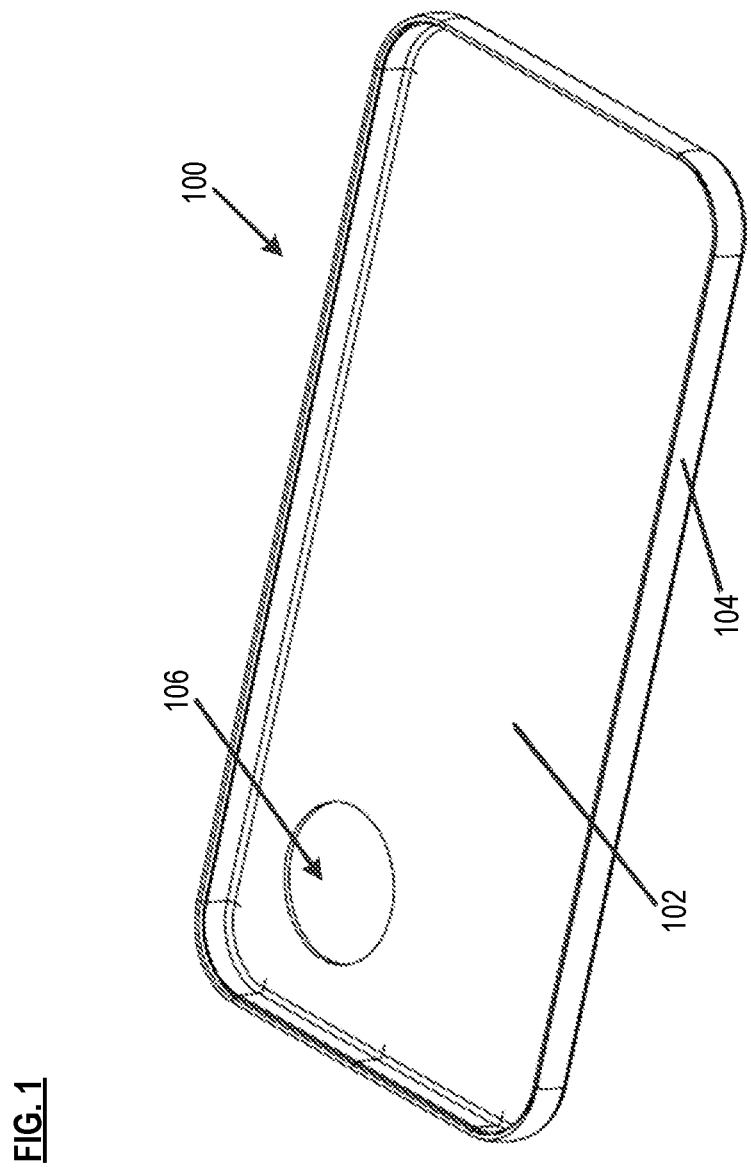
FIG. 1 depicts a rib-and-sheet part.

The following terms, and their inflected forms, are defined for use in this disclosure and the appended claims as follows:

"Fiber" means an individual strand of material. A fiber has a length that is much greater than its diameter. For use herein, fibers are classified as (i) continuous or (ii) short. "Continuous fibers" have a length that is no less than about 60 percent of the length of a mold feature or part feature where they will ultimately reside. Hence, the descriptor "continuous" pertains to the relationship between the length of a fiber and a length of a region in a mold or part in which the fiber is to be sited. For example, if the long axis of a mold has a length of 100 millimeters, fibers have a length of about 60 millimeters or more would be considered "continuous fibers" for that mold. A fiber having a length of 20 millimeters, if intended to reside along the same long axis of the mold, would not be "continuous." Such fibers are referred to herein as "short fibers." The term "short fiber," as used herein, is distinct from the "chopped fiber" or "cut fiber," as those terms are typically used in the art. In the context of the present disclosure, short fibers are present in a preform (of the same length), and substantially all short fibers in the preform are unidirectionally aligned. As such, the short fibers will have a defined orientation in the preform layup or preform charge in the mold and in the final part. As used in the art, "chopped" or "cut" fiber has a random orientation in a mold and the final part. Returning to the example of the 20-millimeter fiber, it is notable that if that fiber is intended for a feature in the mold having a length of about 20 millimeters, then the fiber would be considered to be "continuous." For features that are smaller than the overall size of the mold, the fibers will typically be somewhat longer than the feature, to enable "overlap" with other fibers. For a small feature, the overlap amount could represent the major portion of the length of the fiber.

"Fiber bundle" means plural (typically multiples of one thousand) unidirectionally aligned fibers.

"Compatible" means, when used to refer to two different resin materials, that the two resins will mix and bond with one another.

"Stiffness" means resistance to bending, as measured by Young's modulus.

"Tensile strength" means the maximum stress that a material can withstand while it is being stretched/pulled before "necking" or otherwise failing (in the case of brittle materials).

"Tow" means a bundle of unidirectional fibers, ("fiber bundle" and "tow" are used interchangeably herein unless otherwise specified). Tows are typically available with fibers numbering in the thousands: a 1K tow, 4K tow, 8K tow, etc.

"Prepreg" means fibers, in any form (e.g., tow, woven fabric, tape, etc.), which are impregnated with resin.

"Towpreg" or "Prepreg Tow" means a fiber bundle (i.e., a tow) that is impregnated with resin.

"Preform" means a segment of plural, unidirectionally aligned fibers. The segment is cut to a specific length, and, in many cases, will be shaped (e.g., bent, twisted, etc.) to a specific form, as appropriate for the specific part being molded. Preforms are usually sourced from towpreg (i.e., the tow-preg is sectioned to a desired length), but can also be from another source of plural unidirectionally aligned fibers (e.g., from a resin impregnation process, etc.). The cross section of the preform, and the fiber bundle from which it is sourced typically has an aspect ratio (width-to-thickness) of between about 0.25 to about 6. Nearly all fibers in a given preform have the same length (i.e., the length of the preform) and, as previously noted, are unidirectionally aligned. The modifier "fiber-bundle-based" is often pre-pended, herein, to the word "preform" to emphasize the nature of applicant's preforms and to distinguish them from prior-art preforms, which are typically in the form of segments of tape or in the form of a shape cut from sheets of fiber. Applicant's use of the term "preform" explicitly excludes any size of shaped pieces of: (i) tape (typically having an aspect ratio—cross section, as above—of between about 10 to about 30), (ii) sheets of fiber, and (iii) laminates. Regardless of their ultimate shape/configuration, these prior-art versions of preforms do not provide an ability to control fiber alignment in a part in the manner of applicant's fiber-bundle-based preforms.

"Consolidation" means, in the molding/forming arts, that in a grouping of fibers/resin, void space is removed to the extent possible and as is acceptable for a final part. This usually requires significantly elevated pressure, either through the use of gas pressurization (or vacuum), or the mechanical application of force (e.g., rollers, etc.), and elevated temperature (to soften/melt the resin).

"Partial consolidation" means, in the molding/forming arts, that in a grouping of fibers/resin, void space is not removed to the extent required for a final part. As an approximation, one to two orders of magnitude more pressure is required for full consolidation versus partial consolidation. As a further very rough generalization, to consolidate fiber composite material to about 80 percent of full consolidation requires only 20 percent of the pressure required to obtain full consolidation.

"Preform Charge" means an assemblage of (fiber-bundle-based) preforms that are at least loosely bound together ("tacked") so as to maintain their position relative to one another. Preform charges can contain a minor amount of fiber in form factors other than fiber bundles, and can contain various inserts, passive or active. As compared to a final part, in which fibers/resin are fully consolidated, in a preform charge, the preforms are only partially consolidated (lacking sufficient pressure and possibly even sufficient temperature for full consolidation). By way of example, whereas a compression-molding process is typically conducted at about 150-1000 psi (which will typically be the destination for a preform-charge in accordance with the present teachings), the downward pressure applied to the preforms to create a preform charge in accordance with the present teachings is typically in the range of about 10 psi to about 100 psi. Thus, voids remain in a preform charge, and, as such, the preform charge cannot be used as a finished part.

"Rib-and-Sheet Part" includes a sheet and one or more ribs, wherein the ribs are in intimate contact with and substantially normal to the surface of the sheet. The sheet has a thickness dimension that is much smaller than its length and width dimensions, and the rib has a length dimension that is much greater than its width or height, and wherein the height of the rib is typically greater than or equal to its width.

"Planar" means having a two-dimensional characteristic. The term "planar" is explicitly intended to include a curved planar surface. For example, the "sheet" portion of the rib-and-sheet part, which is considered to be planar, can be curved or flat.

"About" or "Substantially" means+/−20% with respect to a stated figure or nominal value.

Other than in the examples, or where otherwise indicated, all numbers expressing, for example, quantities of ingredients used in the specification and in the claims are to be understood as being modified in all instances by the term "about." Accordingly, unless indicated to the contrary, the numerical parameters set forth in the following specification and attached claims are understood to be approximations that may vary depending upon the desired properties to be obtained in ways that will be understood by those skilled in the art. Generally, this means a variation of at least +/−20%.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10.

The fiber bundles that are segmented, and in some cases shaped, to form preforms for use herein include many individual, unidirectionally aligned fibers, typically in multiples of a thousand (e.g., 1k, 10k, 24k, etc.). Such fiber bundles are typically called "tow." In some embodiments, the fibers in the tow are impregnated with a polymer resin; such material is referred to as "towpreg" or "prepreg tow." Preforms can have any suitable cross-section, such as, without limitation, circular, oval, trilobal, and polygonal.

The individual fibers can have any diameter, which is typically, but not necessarily, in a range of 1 to 100 microns. Individual fibers can include an exterior coating such as, without limitation, sizing, to facilitate processing, adhesion of binder, minimize self-adhesion of fibers, or impart certain characteristics (e.g., electrical conductivity, etc.).

Each individual fiber can be formed of a single material or multiple materials (such as from the materials listed below), or can itself be a composite. For example, an individual fiber can comprise a core (of a first material) that is coated with a second material, such as an electrically conductive material, an electrically insulating material, a thermally conductive material, or a thermally insulating material.

In terms of composition, each individual fiber can be, for example and without limitation, carbon, glass, natural fibers, aramid, boron, metal, ceramic, polymer filaments, and others. Non-limiting examples of metal fibers include steel, titanium, tungsten, aluminum, gold, silver, alloys of any of the foregoing, and shape-memory alloys. "Ceramic" refers to all inorganic and non-metallic materials. Non-limiting examples of ceramic fiber include glass (e.g., S-glass, E-glass, AR-glass, etc.), quartz, metal oxide (e.g., alumina), aluminasilicate, calcium silicate, rock wool, boron nitride, silicon carbide, and combinations of any of the foregoing. Furthermore, carbon nanotubes can be used. Hybrid yarns consisting of dry fibers commingled with polymer filaments can also be used. Chopped fiber can be used as appropriate.

Suitable resin includes any thermoplastic, thermoset, or metal matrix that bonds to itself under heat and/or pressure, although in most embodiments, a thermoplastic is used.

Exemplary thermoplastic resins useful in conjunction with embodiments of the invention include, without limitation, acrylonitrile butadiene styrene (ABS), nylon, polyaryletherketones (PAEK), polybutylene terephthalate (PBT), polycarbonates (PC), and polycarbonate-ABS (PC-ABS), polyetheretherketone (PEEK), polyetherimide (PEI), polyether sulfones (PES), polyethylene (PE), polyethylene terephthalate (PET), polyphenylene sulfide (PPS), polyphenylsulfone (PPSU), polyphosphoric acid (PPA), polypropylene (PP), polysulfone (PSU), polyurethane (PU), polyvinyl chloride (PVC). An exemplary thermoset is epoxy.

FIG. 1 depicts rib-and-sheet part 100, which is an example of a part that can be manufactured by the illustrative embodiment of the invention. Rib-and-sheet part 100 comprises sheet(s) 102 and rib(s) 104. In the illustrative embodiment, rib(s) 104 are disposed at the perimeter of sheet(s) 102. In the embodiment depicted in FIG. 1, sheet(s) 102 includes cutout 106. The cutout is optional, and, to the extent present, can be of any size or shape. In some embodiments, the cutout occupies the entire sheet(s) such that the part being formed is simply a continuous thin rib.

Figure 2:
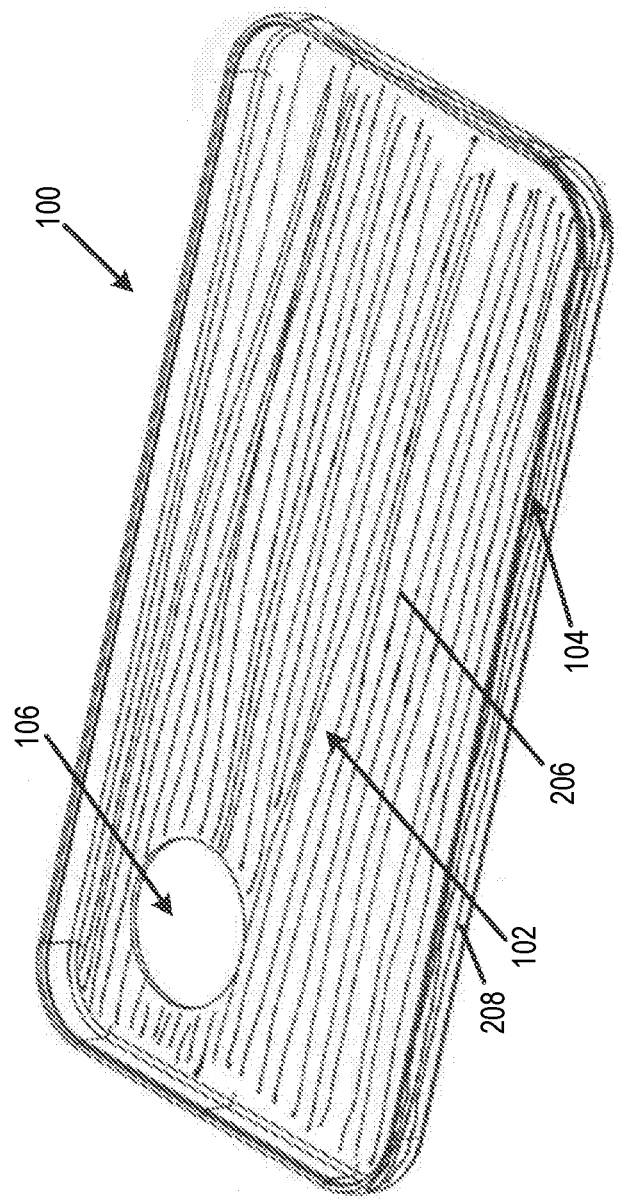
FIG. 2 depicts, for the rib-and-sheet part of FIG. 1, a fiber alignment in accordance with the illustrative embodiment.

FIG. 2 depicts the alignment of fibers in rib-and-sheet part 100. Rib 104 comprises long, unidirectionally aligned, continuous fibers 208 that follow the contour of the rib around the perimeter of the rib-and-sheet part.

Rib 104 is a composite material, and is advantageously formed from a plurality of fiber-bundle-based preforms. For a variety of reasons, in some embodiments, rather than adding individual preforms to the mold to create rib 104, one or more assemblages of such preforms—referred to herein as a "preform charge"—is placed in the mold. The preform charge, which is typically three-dimensional arrangement of preforms, is usually created in a fixture separate from the mold, and which is dedicated and specifically designed for that purpose. To create a preform charge, preforms are placed (either automatically or by hand) in a preform-charge fixture. By virtue of the configuration of the fixture, the preforms are organized into a specific geometry and then tacked together. The preform charge is not fully consolidated, but once the preforms are joined, they will not move, thereby maintaining the desired geometry and the specific alignment of each preform in the assemblage. The shape of the preform charge usually mirrors that of the intended part, or a portion of it, such as, rib 104. See, e.g., Publ. Pat. App. US2020/0114596 and U.S. patent application Ser. No. 16/877,236, incorporated herein by reference.

In some embodiments, each preform, whether present as individual preforms in a layup or tacked together in a preform charge, will have the same composition as all other preforms (i.e., the same fiber type, fiber fraction, and resin type). However, in some other embodiments, some of the preforms can differ from one another. For example, there may be instances in which different properties are desired at different regions within a complex part.

It is preferable, but not necessary, for all preforms to include the same resin. But to the extent different resins are used in different preforms, they must be "compatible," which means that they will bond to one another. A preform charge can also include inserts that are not fiber based. Unless otherwise indicated, the terms "preforms" or "fiber-bundle-based preforms" as used hereinafter in this disclosure and the appended claims, means "preforms and/or preform charge(s)."

Figure 7:
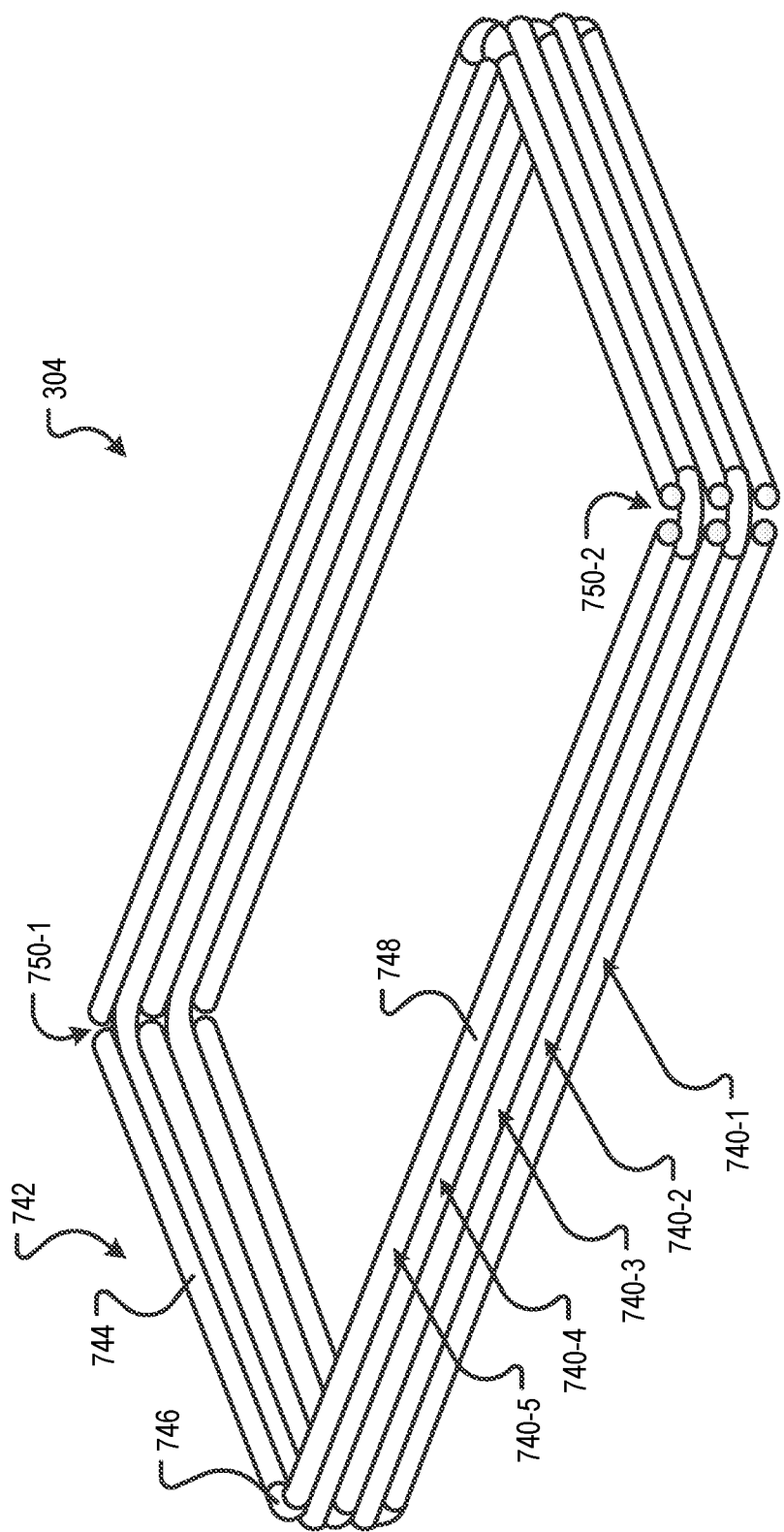
FIG. 7 depicts a preform charge for use in molding a rib-and-sheet part, in accordance with the present teachings.

A. Rib. Preform charge 304 for forming rib 104 is depicted in FIG. 3A, which shows an exploded view of 300 and the feed constituents (i.e., preform charge 304 and sheet 302). FIG. 7 depicts further detail of preform charge 304.

Preform charge 304 includes, in this embodiment, five loops 740-1, 740-2, 740-3, 740-4, and 740-5 stacked one upon the other. Each loop 740-i contains two individual preforms. More particularly, each loop is composed of two "L-shape" preforms 742. In the depicted embodiment, the two preforms in each loop are identical to one another, each having: short arm 744, bend 746, and long arm 748.

The preforms in the preform charge are formed using a sizing/bending machine. The formation of a preform involves appropriately bending towpreg, etc., typically via a robot or other appropriate mechanism, then cutting the bent portion of the fiber bundle to a desired length. As appropriate, the order of the bending and cutting can be reversed.

In the illustrative embodiment, each loop 740-i has two gaps: 750-1 and 750-2, which are the spaces between the two ends of the two preforms. The discontinuities (i.e., the gaps) in each layer should be staggered, so that for each successive layer in the preform charge, the gaps are offset. In other words, if in any given "layer" of the preform charge, gap 750-1 is positioned at "corner 1" and gap 750-2 is positioned at "corner 3" of the loop, then the gaps in the underlying and overlying layers will be positioned at "corner 2" and "corner 4." This enhances the strength of the preform charge as well as the molded part. Thus, at any given "corner," gaps and bends will alternate for successive layers.

In some other embodiments, the loops can be configured differently than described above. For example, the loop can be configured as one rectangular shaped preform with a break where the preform begins and ends, or two "U" shaped preforms, or straight preforms combined with "L" or "U" shaped preforms, etc. In some embodiments, more than two preforms are used to form the layer. For optimal strength and stiffness, the number of preforms should be minimized and breaks between preforms where one preform ends and the other starts should be staggered from layer to layer (as shown in FIG. 7). Also, the structure of the loop can vary from layer to layer.

Different materials can be used in the same preform charge. That is, there can be preform-to-preform differences in materials (i.e., fiber and/or resin). It is, however, preferable to have the matrix material (the resin) be the same through all preforms. But as long as different matrices can be bonded to one another (referred to as the matrices/resins being "compatible"), then preform-to-preform variation in the matrix material is acceptable.

After the various loops 740-i are stacked, the preforms are advantageously tacked/joined together. This can be performed by heating them and then pressing them together. Other techniques for tacking/joining include ultrasonic welding, friction welding, lasers, heat lamps, chemical adhesives, and mechanical methods such as lashing.

B. Sheet. In the illustrative embodiment, sheet 102 of rib-and-sheet part 100 includes long, continuous fibers 206 running along the long axis of the part. The sheet can be formed, in advance, from a plurality of fiber-bundle-based preforms positioned side-by-side, either in the form of a layup of individual preforms or as a preform charge. In some other embodiments, sheet 102 can formed from two or more plies of material, such as tape or fabric. Tape is available with fibers unidirectionally aligned. The relatively flat form factor of tape, which is normally a hindrance to fiber alignment, is suitable for use in creating planar parts or segments, such as sheet 102. The plies can contain different types of fiber, can have a different overall fiber-volume fraction, and/or can contain fibers of different length. Each ply has a thickness that is typically less than about 0.25 millimeters.

In some embodiments, the fibers in one of the two plies will have its fibers aligned in a different direction(s) than the fibers in the other of the two plies. As will be appreciated by those skilled in the art, fiber is strong in tension along its length. If tape is used as the plies (tape has its fibers oriented in a single direction), and both plies have their fibers oriented in the same direction, then the laminate formed therefrom will be strong in tension in only the one direction in which the fibers are oriented. If, on the other hand, the fibers in the two tape-based plies are oriented orthogonally with respect to one another, then the laminate formed from those two plies will be strong in the two orthogonal directions. If the fibers in one of the tape-based plies are oriented +45° and the fibers in the other of the tape-based plies are oriented −45° (with respect to the long axis of the laminate to be formed), then the laminate will have an enhanced ability to resist shear stress (torsion). If a woven mat is used as the plies, then each ply is strong is two orthogonal directions. If one of the plies is rotated 45° with respect to the other ply, then the resulting laminate will be strong in tension in four directions (e.g., 0°, 90°, −45°, and +45°, etc.).

In some embodiments, both of the plies include chopped fiber (i.e., defined as either or both of chopped fiber or chopped prepreg), as well as continuous fiber. In some embodiments, one of the plies includes only chopped fiber. In some further embodiments, both of the plies include only chopped fiber. And in yet some additional embodiments, one or both of the plies include only continuous fiber.

In some further embodiments, one or both of plies consists of a material other than a composite, wherein that material can be co-molded with the composite rib. Examples of such a material include, without limitation, plastic, steel, or aluminum. In embodiments in which one or both of the plies is metal, the bonding surface thereof is preferably textured to improve the bond. Typical texturing techniques include anodizing or mechanical methods.

In some embodiments, sheet 102 is flat, and then formed into a slightly curved shape during molding step. Sheet 102 can be curved about one or more axes.

As previously noted, the feed constituents can include a sheet, or sheet precursors, and a layup of individual preforms, or an assemblage thereof (i.e., a preform charge). For use herein and the appended claims, the term "sheet" means "a sheet or sheet precursors" unless otherwise indicated, and the term "preform assemblage" means a layup of individual fiber-bundle-based preforms or a preform charge (comprising fiber-bundle-based preforms), unless otherwise indicated.

FIG. 3A depicts an exploded view of the components comprising mold 300, as well as the feed constituents, which include sheet 102 and preform charge 304.

Mold 300 comprises cavity base 310, cavity-defining member 312, standoffs 314 (a front-side standoff, normally present, is omitted for clarity), insert 316, die springs 318, core 320, press block 322, beams 324, and shoulder bolts 326.

The arrangement of elements in FIG. 3A provides an embodiment of the order of assembly of the mold and constituents. Cavity-defining member 312 is fastened to cavity base 310. Standoffs 314 are attached to cavity-defining member 312 (although, in some other embodiments, standoffs 314 can be attached to cavity-defining member 312 later in the assembly). Sheet 102 is placed in cavity 313, with cutout 306 fitting over mating boss 311 on cavity base 310. Insert 316 is placed in cavity 313 on top of sheet 102. Preform charge 304 is placed around the perimeter of insert 316 and resides on marginal region or shelf 317 formed near the bottom of insert 316. Die springs 318 are placed on insert 316.

Figure 3B:
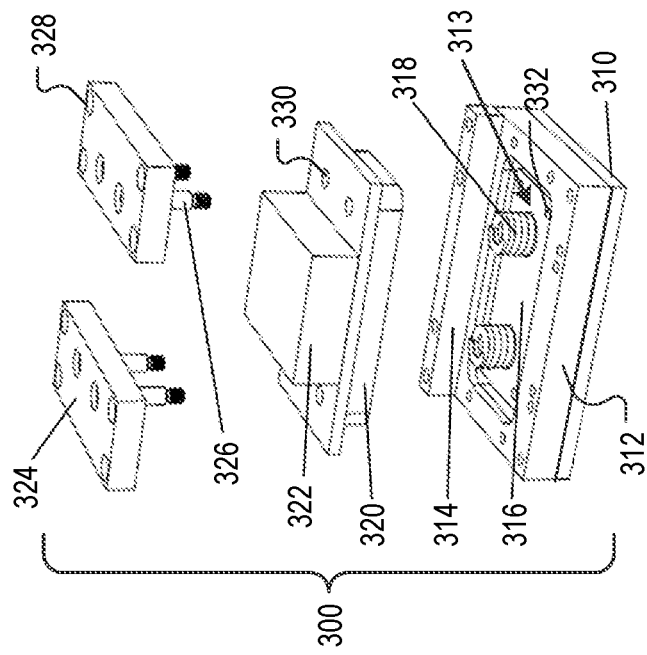
FIG. 3B depicts the mold of FIG. 3 partially assembled.
Figure 3A:
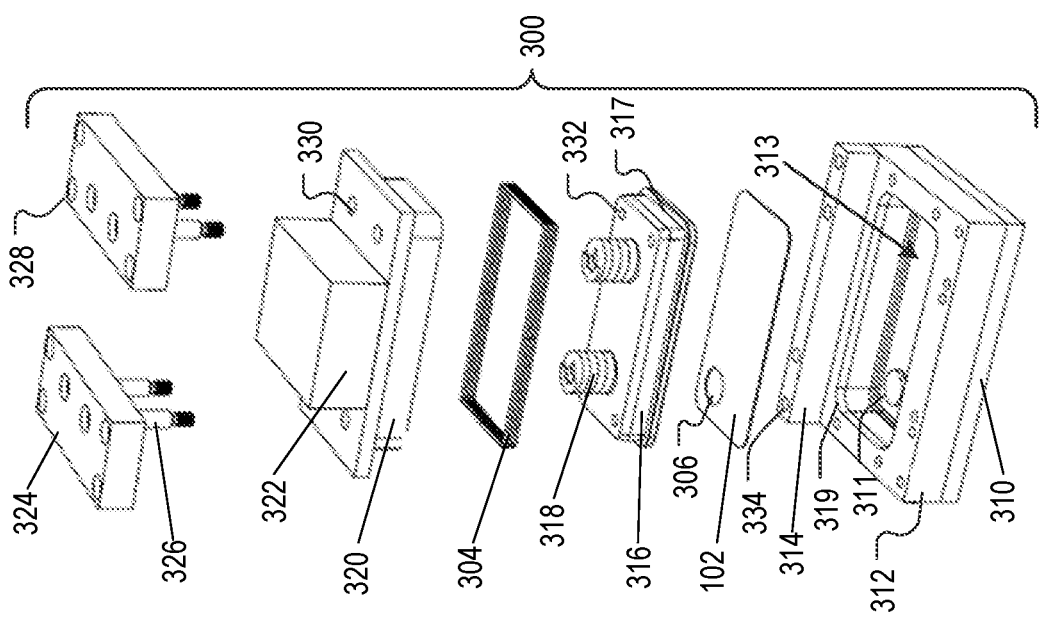
FIG. 3A depicts an exploded view of an embodiment of a mold for forming the rib-and-sheet part of FIGS. 1 and 2.

FIG. 3B depicts mold 300 partially assembled. Sheet 102, insert 316, and preform charge 304 are shown as having already been placed in cavity 313. Insert 316 is "floating" at this point and is not rigidly fixed in position. A pocket (not depicted) on the underside of insert 316 mates with boss 311 on cavity base 310. This provides initial lateral location, but not rotation, in the case of circular cutout 306. Location via the pocket and boss 311 depends on the tolerances between these two features.

Core 320 is placed on insert 316 and initially rests on die springs 318. Placing core 320 on insert 316 and in cavity 313 begins to more precisely align insert 316 via lead-in chamfer 319 features on cavity-defining member 312 and insert 316.

Shoulder bolts 326, which couple to beams 324, pass through holes 330 in core 320 and into holes 332 of insert 316, ultimately threading into the insert. Thus, core 320 is free to move vertically along the shoulder bolts 326. When fully assembly, four screws 439 (see FIG. 4A) pass through four openings 328 located near respective corners of each cross beam 324. Screws 439 are threaded into openings 334 in standoffs 314. Thus, beams 324 have a fixed vertical displacement from standoffs 314. Because the beams 324 and standoffs 314 have a fixed vertical displacement, a minimum vertical position for mold insert 316 is established by providing shoulder bolts 326 having a specific length. In this manner, the thickness of sheet 102 can be set for the finished rib-and-sheet part 100.

In some alternative embodiments, rather than placing standoffs 314 on cavity-defining member 312 earlier in the assembly, the standoffs are first coupled to crossbeams 324 and then attached to upper surface of cavity-defining member 312.

FIG. 4A depicts a top view and FIG. 4B depicts an offset sectional view of mold 300, as assembled. In the illustrative embodiment, cavity-defining member 312 and cavity base 310 are necessarily separate parts due to the curvature in the cross section of the walls of preform charge 304. The curved walls form an undercut in cavity 313, which necessitates the cavity-defining member and cavity base being separate components for removal of the molded part. For straight-walled ribs or ribs having an appropriate draft angle, cavity-defining member 312 and cavity base 310 could be a single part.

Within mold 300, insert 316 rests on sheet 102 and is located laterally by boss 311 on cavity base 310 and the pocket (not depicted) on insert 316 that corresponds to the circular cutout in the sheet. This feature alone does not fix lateral rotation, so insert 316 is further located by core 320 mating with lead-in chamfer features 319 and 436 on cavity-defining member 312 and insert 316, respectively.

For a part that does not include a cutout in sheet 102, insert 316 would be located entirely by lead-in chamfer 319 on cavity-defining member 312 and lead-in chamfer 436 on insert 316. Alternatively, shoulder bolts 326 may run through linear bearings or bushings in beams 324 to provide lateral location. Thus, boss 311, lead-in chamfer 319, and screws 326 can all be used as registration features.

Die springs 318 hold core 320 in position above preform charge 304. Moreover, they act to keep sheet 102 in place during the molding sequence by providing a substantial downward force on insert 316. As those skilled in the art will appreciate, a die spring is a type of compression spring. A compression spring resists a compressive force. When pressure is applied, the compression spring shortens in length, storing mechanical energy. Die springs are a high-force compression spring, which provide a consistent predetermined pressure at a given amount of compression. Although preferred for use in conjunction with the present invention, other elastic objects/devices that resist a compressive force and provide the functions described for die spring 318, may be used as alternatives/equivalents thereof.

As previously mentioned, standoffs 314, crossbeams 324, and shoulder bolts 326 set a minimum vertical position for insert 316 and, therefore, the thickness of sheet 102 in the finished rib-and-sheet part 100. At this point in the process, sheet(s) 302 may take up more vertical space than in the finished part, and insert 316 and shoulder bolts 326 would sit a little higher than after molding and consolidation.

Press block 322 is placed on top of core 320 and is used to clear crossbeams 324 during the molding sequence. In an alternative embodiment, the press block and core are combined into a single part; however, keeping them separate as in the illustrative embodiment can save costs by making press block 322 out of a cheaper material than core 320. For example, in some embodiments, press block 322 is made from aluminum and core 320 comprises tool steel.

Mold 300, now assembled, is ready to be placed in a heated compression press for the molding sequence. The molding sequence depends on the material being used and follows a predetermined sequence of heat and pressure to mold and consolidate the final part. Pressure is usually in the range of about 100 psi to about 1000 psi, and temperature, which is a function of the particular resin being used, is typically in the range of about 150° C. to about 400° C. Elevated pressure and temperature are typically maintained for a few minutes. Such compression molding protocols are well known in the art.

FIG. 5A depicts a top view and FIG. 5B depicts an offset sectional view of mold 300 after the molding sequence is complete and prior to ejection of the finished part, in this embodiment, rib-and-sheet part 100.

In FIG. 5B, downward pressure on press block 322 has forced core 320 downward, as compared to FIG. 5A. Die springs 318 maintain pressure on sheet 102 during the molding process to keep it in place and consolidate it to final thickness.

Shoulder bolts 326 provide a hard stop to set the final thickness of the sheet and prevent uneven compression thereof. In this embodiment, boss 311 on cavity base 310 and the pocket on insert 316 that correspond to circular cutout 106 in structure 100 also provide a positive stop to set the final thickness of sheet 102. However, because circular cutout 106 is only in one corner of the part, uneven compression resulting in non-uniform thickness is still possible if shoulder bolts 326 are not in place. If a part contained multiple cutouts, or a large enough center cutout to set sheet thickness, then shoulder bolts 326, standoffs 314, and crossbeams 326 would not be necessary.

There is an optional hard stop between core 320 and cavity-forming member 312. There is also a hard stop between core 320 and insert 316. This hard stop is where the base of core 320 abuts marginal region/shelf 317 of insert 316. This hard stop is important as it reduces or eliminates flash, and forces all of the material into the ribs.

In the molding method described herein, rib(s) 104 can be thinner in width than the diameter of the preforms used to make them. As heat and pressure are applied to preform charge 304 via core 320, the thermoplastic resin in the preform assemblage exceeds its heat-deflection temperature and starts to flow. Additionally, to the extent that the feed constituents include sheet precursors, the thermoplastic resin in the sheet precursors (typically the same as that in the preform assemblage) is also heated in excess of its heat-deflection temperature. By the end of the molding sequence (i.e., after the hold at elevated temperature and pressure is complete), all of the preforms comprising preform charge 304 have flowed into rib cavity 437 to form ribs 104 and core 320 abuts marginal region/shelf 317 of insert 316 and closes gap 438 (see, FIG. 4B) to form the top of ribs 104.

The mold is then removed from the source of pressure and the mold sections are cooled. Once cooled, the mold can be disassembled to obtain the finished part.

Figure 6:
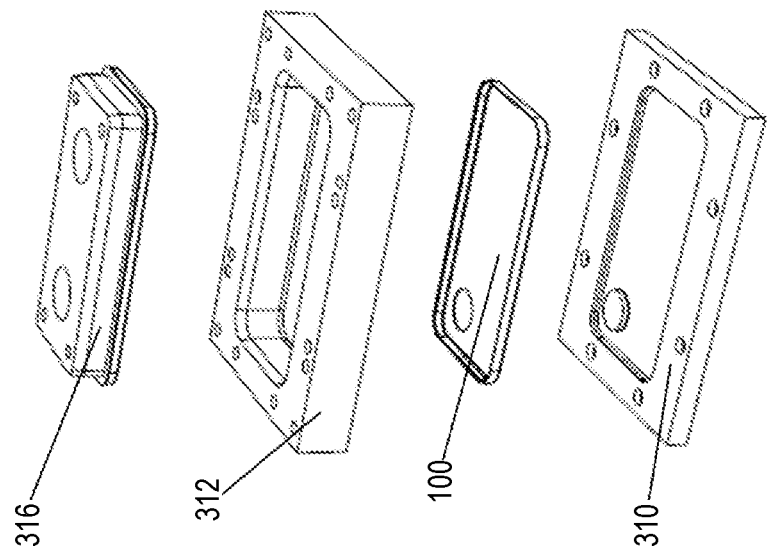
FIG. 6 depicts the manner in which the finished rib-and-sheet part is removed from the mold.

FIG. 6 depicts ejection of finished rib-and-sheet part 100. Due to the undercut in cavity-forming member 312 caused by the curvature of ribs 104, the part must be removed from the bottom of the cavity forming member. To do this, shoulder bolts 326, beams 324, standoffs 314, press block 322, and die springs 318 are removed. Insert 316 is then lifted slightly to break it free of rib-and-sheet part 100. Cavity base 310 is removed and then insert 316 is used to press and eject rib-and-sheet part 100 from cavity 313.

The illustrative embodiment depicts a part with a continuous rib around the perimeter of a sheet. In some other embodiments, there are one or more ribs spanning the perimeter rib(s), thereby subdividing sheet 102 into two or more regions. In such embodiments, a separate insert 316 would be required for each such region.

The illustrative embodiment depicts part 100 as having a substantially flat sheet 102, curving slightly upward at the perimeter thereof. In some other embodiments, the sheet can be curved in one or more directions.

It is to be understood that the disclosure describes a few embodiments and that many variations of the invention can easily be devised by those skilled in the art after reading this disclosure and that the scope of the present invention is to be determined by the following claims.

What is claimed:

1. A compression mold for forming, via compression molding, a part using a preform assemblage and a sheet as feed constituents, wherein the preform assemblage comprises a plurality of fiber-bundle-based preforms, and wherein the part comprises a sheet portion and a rib, and wherein the rib has a first width, the compression mold comprising:
   a cavity-defining member, the cavity-defining member having an internal wall defining a perimeter of a cavity; and
   a mold insert, wherein the mold insert is dimensioned to be received within the perimeter of the cavity, the mold insert having a shelf-defining portion and a main body, wherein the shelf-defining portion extends beyond a width and a length of the main body, thereby defining a shelf that extends beyond a perimeter of the main body, and wherein a height of the main body defines side walls at the perimeter of the main body;
   a first gap defined between the sidewalls of the mold insert and the internal wall of the cavity-defining member, wherein the first gap is dimensioned to receive and retain the preform assemblage;
   a second gap defined between a perimeter of the shelf of the mold insert and the internal wall of the cavity-defining member, wherein the second clap defines the first width of the rib, and wherein the second gap is smaller than the first gap, and wherein the second gap is in fluidic communication with the first gap and with the sheet which, during compression molding operations, is disposed under the shelf-defining portion of the mold insert.

2. The compression mold of claim 1 comprising a mold core, wherein the mold core includes a wall that is dimensioned to be received by the first gap.

3. The compression mold of claim 2 comprising a compression spring, wherein the compression spring abuts an upper surface of the main body of the mold insert and abuts a portion of the mold core.

4. The compression mold of claim 3 wherein the compression spring is a die spring.

5. The compression mold of claim 2 comprising:
   a standoff, wherein the standoff extends upward with respect to an upper surface of the cavity-defining member, limiting movement of the mold core towards the mold insert; and
   a beam, wherein the beam is rigidly coupled to the standoff thereby establishing a fixed vertical position for the beam.

6. The compression mold of claim 3 comprising a plurality of shoulder bolts, wherein the shoulder bolts extend from the beam, pass through the mold core, and are threaded into the mold insert.

7. The compression mold of claim 2 comprising:
   a plurality of shoulder bolts, wherein the mold core slides along the shoulder bolts towards the mold insert when urged by an applied force, the shoulder bolts functioning as a first registration feature that facilitates positioning of the mold insert and the mold core in the perimeter of the cavity; and
   a second registration feature that facilitates positioning the mold insert and the mold core in the perimeter of the cavity.

8. The compression mold of claim 5 comprising a plurality of shoulder bolts having a first length, wherein the shoulder bolts extend from the beam, pass through the mold core, and are threaded into the mold insert, the fixed vertical position of the beam and the first length of the shoulder bolts thereby defining the vertical position of the mold insert, and, hence, a thickness of the sheet portion of the part.

9. The compression mold of claim 1 comprising a cavity base, wherein the cavity base couples to the cavity-defining member, the cavity base providing a bottom surface of the cavity.

10. The compression mold of claim 1 comprising a cavity base, wherein the cavity base couples to the cavity-defining member, the cavity base providing a bottom surface of the cavity, and wherein the cavity base includes a registration feature.

11. A compression mold for forming, via compression molding, a part using a preform assemblage and a sheet as feed constituents, and wherein the part comprises a sheet portion and a rib, the rib having a first width, the compression mold comprising:
   a cavity-defining member, the cavity-defining member having an internal wall defining a perimeter of a cavity;
   a mold insert received within the perimeter of the cavity, the mold insert having a main body and a marginal region extending beyond a perimeter of the main body, the main body having sidewalls at the perimeter thereof;
   a first gap defined between the sidewalls of the mold insert and the internal wall of the cavity-defining member, wherein the first gap is dimensioned to receive and retain the preform assemblage; and
   a second gap defined between a perimeter of the marginal region of the mold insert and the internal wall of the cavity-defining member, wherein the second gap defines the first width of the rib.

12. The compression mold of claim 11 comprising a mold core, wherein a first portion of the mold core is physically configured to be received by the first gap, and therefore directly contacts and compresses the preform assemblage during compression molding operations, and wherein the mold core is physically arranged to compress the sheet by transferring an applied force to the mold insert.

13. The compression mold of claim 12 comprising a compression spring disposed between the mold insert and the mold core.

14. The compression mold of claim 12 comprising:
a beam having a fixed vertical position with respect to the cavity-defining member; and
a plurality of shoulder bolts having a first length, wherein the shoulder bolts extend from the beam, pass through the mold core, and are threaded into the mold insert, the fixed vertical position of the beam and the first length of the shoulder bolts thereby defining the vertical position of the mold insert relative to a bottom of the cavity, and, hence, determining a thickness of the sheet portion of the part.

15. The compression mold of claim 12 comprising a plurality of shoulder bolts, wherein the mold core is arranged to slide along the shoulder bolts towards the mold insert when urged by an applied force, the shoulder bolts functioning as a first registration feature that facilitates positioning of the mold insert and the mold core in the perimeter of the cavity.

16. The compression mold of claim 15 comprising a second registration feature that facilitates positioning the mold insert and the mold core in the perimeter of the cavity.

17. A compression mold for forming, via compression molding, a part using a preform assemblage and a sheet as feed constituents, and wherein the part comprises a sheet portion and a rib, and wherein the rib has a first width, the compression mold comprising:
a cavity-defining member, the cavity-defining member having an internal wall defining a perimeter of a cavity;
a mold insert received within the perimeter of the cavity, the mold insert having a main body and a marginal region extending beyond a perimeter of the main body;
a first gap defined between the perimeter of the main body and the internal wall of the cavity-defining member, wherein the first gap is dimensioned to receive and retain the preform assemblage;
a second gap defined between a perimeter of the marginal region of the mold insert and the internal wall of the cavity-defining member, wherein the second gap is in fluidic communication with the first gap; and
a mold core, wherein a first portion of the mold core is dimensioned and physically configured to be received by the first gap.

18. The compression mold of claim 17 comprising:
a beam having a fixed vertical position with respect to the cavity-defining member; and
a plurality of shoulder bolts extending from the beam and passing through the mold core and coupling to the mold insert.

* * * * *